United States Patent [19]

Wimbush

[11] Patent Number: 4,872,396
[45] Date of Patent: Oct. 10, 1989

[54] HYDRAULIC CYLINDER WITH LINER AND A RETAINER

[75] Inventor: Maurice J. Wimbush, Whitnash, England

[73] Assignee: Automotive Products, plc, Warwickshire, United Kingdom

[21] Appl. No.: 180,248

[22] Filed: Apr. 11, 1988

[30] Foreign Application Priority Data

Apr. 16, 1987 [GB] United Kingdom ............... 8709190

[51] Int. Cl.⁴ .............................................. F01B 11/02
[52] U.S. Cl. ........................... 92/169.1; 29/156.4 WL; 29/469.5; 29/515; 29/527.4; 264/274
[58] Field of Search ................ 92/169.1, 169.2, 169.3, 92/169.4, 171; 60/533, 589; 29/527.4, 156.4 WL, 469.5, 515, 516; 264/274, 275

[56] References Cited

U.S. PATENT DOCUMENTS 4,122,596 10/1978 Fields ................................. 29/527.2
4,242,869 1/1981 Sakazume ......................... 91/171 X
4,276,994 7/1981 Spalding ........................... 60/533 X
4,785,721 11/1988 Leigh-Monstevens et al. ... 92/169.1 X

FOREIGN PATENT DOCUMENTS 143867 12/1978 Japan ..................................... 60/589
 39872  3/1980 Japan ..................................... 92/171
158155  9/1982 Japan ..................................... 92/171

*Primary Examiner*—Robert E. Garrett
*Assistant Examiner*—Mark A. Williamson
*Attorney, Agent, or Firm*—Krass and Young

[57] ABSTRACT

The structure comprises a molded plastics housing either having a metallic sleeve molded therein which forms a cylinder for a piston or defining the cylinder itself. An annular retainer for the piston is provided which abuts a location surface of the sleeve or an anchoring element molded in the housing. The location surface is provided by deforming the sleeve or anchoring element so that the location surface engages the annular retainer at a position radially inboard of its outer periphery.

25 Claims, 3 Drawing Sheets

HYDRAULIC CYLINDER WITH LINER AND A RETAINER

The present invention relates to hydraulic cylinders and particularly, but not exclusively, to a hydraulic cylinder consisting of a plastic housing molded around a metallic sleeve.

Hydraulic cylinders, such as hydraulic brake master cylinders and master and slave cylinders for hydraulic apparatus controlling the operation of motor vehicle mechanical clutches, have in the past included a piston housing molded entirely of impact and burst resistance plastics or a housing of plastic provided with an internal metallic tubular member or sleeve defining the bore the cylinder in which the piston reciprocates.

Where the housing is provided with the metallic sleeve, the moulded plastics housing is formed with a bore which may be tapered to provide a certain amount of draft to facilitate unmolding, as is well known in the art. The bore of the plastic housing is subsequently provided with the metallic sleeve made of steel, aluminum or other metal or metal alloy which provides a smooth and substantially cylindrical surface in which the piston, including the piston seal, is slidably disposed. Such a structure requires that means be provided for retaining the metallic sleeve in the bore of the plastic housing to prevent longitudinal motion of the sleeve relative to the housing and to ensure appropriate sealing from the ambient, principally at the pressure end of the cylinder. In addition in view of progressive increasing clearance from one end of the cylinder to the other between the peripheral cylindrical surface of the metallic sleeve and the tapered, due to the required draft, internal surface of the plastic housing, additional seal means are provided between the metallic sleeve and the bore of the housing, not only at the pressure end of the cylinder, but also at the open end of the cylinder in order to prevent leakage of hydraulic fluid from the interior of the cylinder to the ambient, and a retainer is installed at the open end of the cylinder for preventing the piston from escaping from the cylinder bore.

Stringent sealing requirements are particularly prevalent in master cylinder structures. Hydraulic master cylinders are connected to a supply of hydraulic fluid in a reservoir which is either formed integrally with the cylinder housing or made separate from the cylinder housing and connected thereto by an appropriate conduit. Hydraulic fluid is supplied from the reservoir to the master cylinder pressure chamber through appropriate ports through the wall of the cylinder such that loss of hydraulic fluid from the system may be compensated for and excess fluid, due to heat expansion for example, may be returned to the reservoir of fluid. The port or ports through the wall of the cylinder are appropriately masked by the piston seal at the beginning of the piston working stroke such as to cut-off the reservoir from the cylinder pressure chamber during operation. Because the ports are formed through the wall of the cylinder housing and through the wall of the metallic sleeve or liner, and, because in the prior art structures a narrow space exists between the peripheral surface of the sleeve or liner and the internal surface of the housing due to the fact that the internal bore in the housing is frusto-conical rather than perfectly cylindrical and the peripheral surface of the sleeve or liner cylindrical is circularly cylindrical and of constant diameter from end to end, the entire narrow annular space between the bore of the cylinder and the peripheral surface of the sleeve or liner is filled with hydraulic fluid thus requiring additional sealing means to be provided to prevent escape of hydraulic fluid at the ends of the cylinder.

In our U.K. Patent Application No. 2194833 we have described a method for making a hydraulic cylinder comprising molding a housing defining the housing of said cylinder around a tubular sleeve having an internal bore defining the bore of said cylinder, said internal sleeve having means at least at one end projecting into the material of said housing for anchoring said sleeve within said housing.

A composite hydraulic cylinder structure made in accordance with that method is shown in FIGS. 1 and 2 of the accompanying drawing taken from U.K. No. 2194833, FIG. 1 being a longitudinal section through such a cylinder and FIG. 2 being a partial view of FIG. 1 drawn at an enlarged scale.

In FIG. 1, the hydraulic cylinder, for example a master cylinder 10 is illustrated as consisting of a housing 12 cast or molded over a thin wall metallic sleeve or liner 14. The housing 12 is preferably made of plastic such as ABS, phenolic resin, plyamide, PVC, and the like. Only the elements necessary to a proper understanding of the cylinder construction are shown at FIG. 1 and the piston reciprocable in the bore 16 of the sleeve or liner 14, together with the piston rod, piston seal or seals, the piston return spring, and the means for coupling the piston to the piston rod have been omitted for the sake of clarity.

The cylinder housing 12 has an integrally molded mounting flange 18 proximate one end and a boss 20 at the other end provided with a stepped bore 22 for fastening therein the end of a conduit, not shown, provided with an appropriate fitting, not shown, such that hydraulic fluid can be transferred from the bore 16 of the cylinder 12 to a slave cylinder, not shown, when the master cylinder piston, not shown, is reciprocated within the bore 16 in the sleeve or liner 12.

In the structure illustrated, a reservoir of hydraulic fluid 24 is built-in or formed integral with the cylinder housing 12. The reservoir 24 is placed in communication with the internal bore 15 of the sleeve or liner 14 by means of an opening 26 at the bottom of the reservoir 24 and a pair of ports 28 and 30 through the wall of the sleeve or liner 14. After the housing 12 and the integral reservoir 24 have been molded around the metallic sleeve or liner 14, and the assembly is removed from the mold, the port 28, or "recuperation" port, and the port 30 or "cut-off" port, are punched out or drilled, the punching tool or the drill being introduced through the opening 26 at the bottom of the reservoir 24 which, during molding of the housing 12 around the sleeve or liner 14 is formed by an appropriate core rod having its end in engagement with the outer surface of the sleeve or liner 14. The punching or drilling of the ports 28 and 30 is effected with great care such as to prevent forming a burr at the edge of the ports within the bore 6 in the sleeve or liner 14. Electrical discharge (EDM) drilling may be used, as precision drilling by EDM permits not only to obtain burrless apertures but, in addition, permits to obtain apertures of any shape, such as square or rectangular for example, which cannot be obtained with a rotating cutting tool such as a drill. Alternatively the reservoir of fluid is remotely located and connected by means of a flexible tubing to a fitting molded integral with the housing 12, as shown in FIG. 5 of No. 2194833.

The sleeve or liner 14 is provided at one end with a formed offset portion generally designated at 32, best shown at FIG. 2.

The offset portion 32 forms an exteriorly extending annular bead 34 and a corresponding internal annular groove 36. The exteriorly extending annular bead 34 provides secure anchoring of the sleeve or liner 14 in the molded plastic housing 12, and prevents longitudinal motion of the sleeve or liner relative to the housing 12 that may cause separation of the sleeve or liner 14 from within the housing 12. The internal annular groove 36 provides an arcuate recess in which is placed an annular piston retainer, for example in the form of a spring clip 38 preventing the piston 40, shown in phantom lines at FIG. 2 from escaping from the internal bore 16 in the sleeve or liner 14 under the action of the piston return spring.

The other end of the metallic sleeve or liner 14 is provided with an internally turned flange 42, which provides appropriate anchoring of that end of the sleeve or liner 14 in the molded housing 12. An annular elastomeric O-ring 44 is placed against the internal curved junction surface 46 between the flange 42 and the main portion of the sleeve or liner 14 prior to molding the housing 12 around the sleeve or liner for sealing the pressure end of the cylinder 10.

Alternatively, the sleeve or liner 14 may be retained as shown in FIG. 4 of No. 2194833.

As mentioned above, the spring clip 38 is placed in the recess provided by the groove 36. However the groove 36 has an inclined end wall 36a created by the formation of the offset portion 32. The end wall 36a is used to take axial loads applied by the return spring of the piston and tends to retain the peripheral edge of the spring clip 38 by a wedge action.

Retention of the piston is also necessary in the case where the housing itself is moulded to define a cylinder in which the piston reciprocates.

An object of the present invention is to provide a more positive location for the piston retainer.

According to one aspect of the invention there is provided a hydraulic cylinder comprising a housing in which a piston is slidably mounted and retention means moulded into the housing, said retention means being deformed to provide a surface engageable with a piston retainer member at a position radially inboard of an outer periphery of the retainer member, the housing and retention means being formed from dissimilar materials.

With such an arrangement the surface provides a more positive location for the retainer member, e.g., a spring ring or clip, than the wedge-type retention described above.

According to another aspect of the invention there is provided a method for making a hydraulic cylinder comprising molding from one material a housing for a piston around retention means of a different material, the retention means having been deformed to provide a surface engageable with a piston retainer member at a position radially inboard of an outer periphery of the retainer member.

In one embodiment the surface is provided by shearing a portion of the retention means to provide at least one radially inward projection engageable with the retainer member.

A plurality of such projections may be so formed and may be equally spaced circumferentially.

In another embodiment the surface is provided by bending inwardly back upon itself a portion of the retention means so that an edge of the retention means forms said surface engageable with the retainer member. The retention means is preferably tubular with an end portion thereof bent back on itself. In such a case, the bent end portion of the retention means may form an annular abutment surface for the retainer member.

Preferably the deforming of the retention means forms means for anchoring said sleeve to said housing. The means may take the form of a radially extending surface or surfaces around which the housing is molded.

Where the housing is molded around a tubular sleeve defining the cylinder in which the piston is slidable, the retention means is preferably arranged to retain the sleeve in the housing.

In one embodiment, the retention means forms an integral part of the sleeve and is preferably formed at one end of the sleeve. The deformation on the retention means serves to prevent longitudinal displacement of the sleeve relative to the body and vice versa.

In another embodiment, the retention means and the sleeve are two separate elements. The retention means in such a case may comprise an anchoring element having a surface which is engageable with the sleeve so as to retain the sleeve in the housing.

The invention will now be described by way of example with reference to the accompanying drawings in which.

Figure 2:
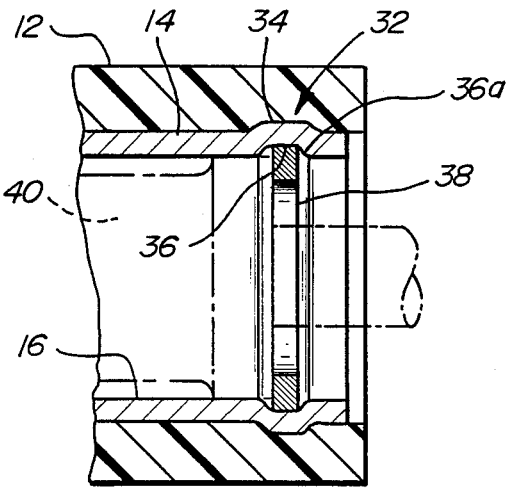
Figure 3:
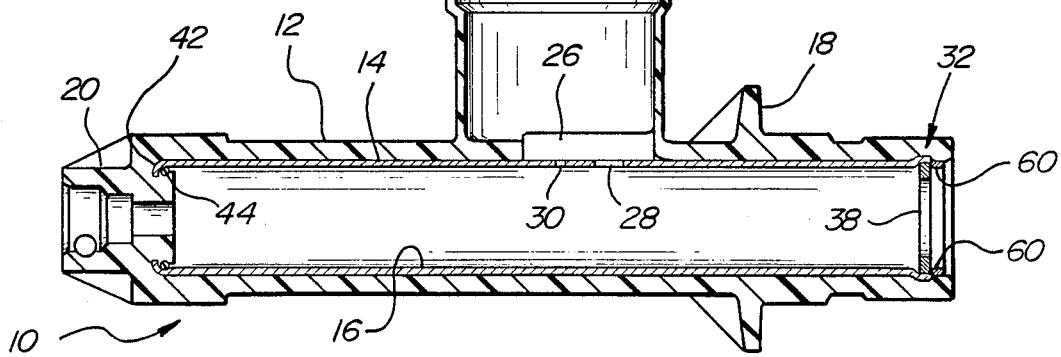
FIG. 3 is a view similar to FIG. 1 but showing one form of hydraulic cylinder in accordance with the present invention.
Figure 4:
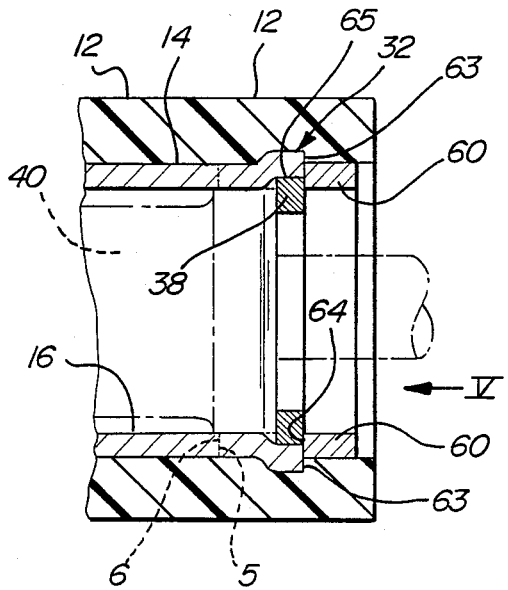
Figure 5:
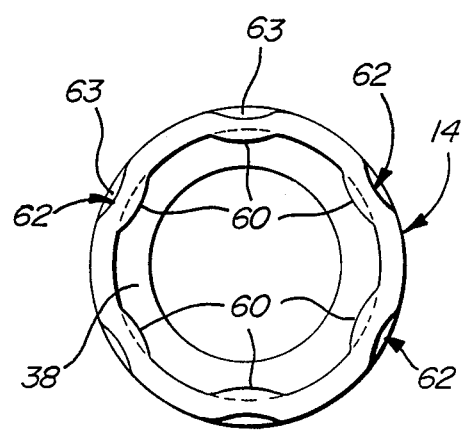
Figure 6:
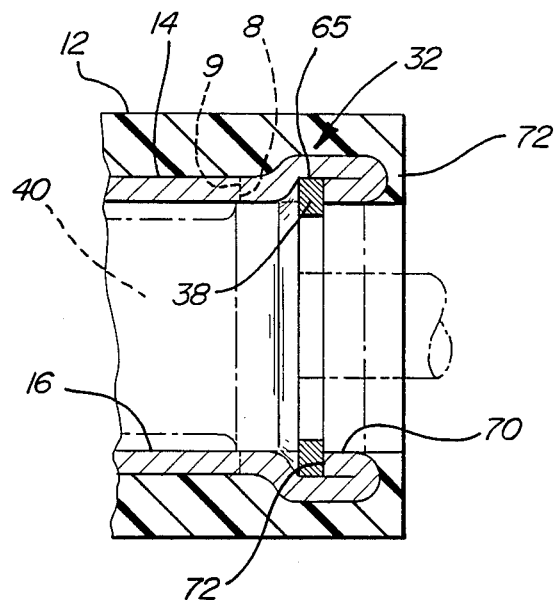
Figure 7:
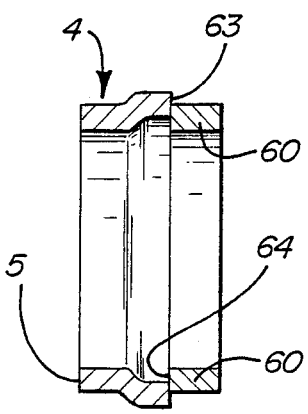
Figure 9:
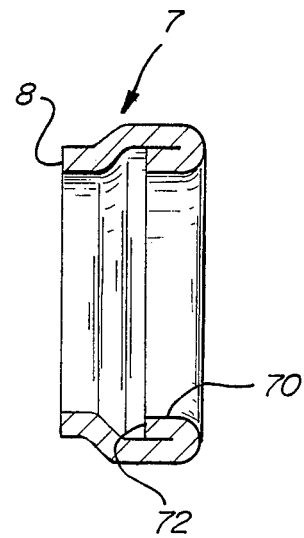
Figure 8:
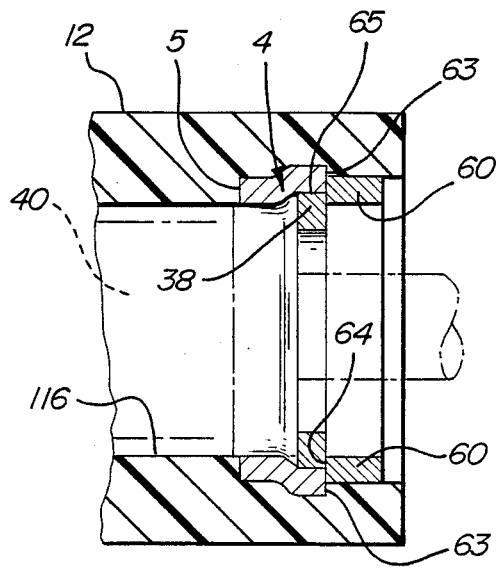
Figure 10:
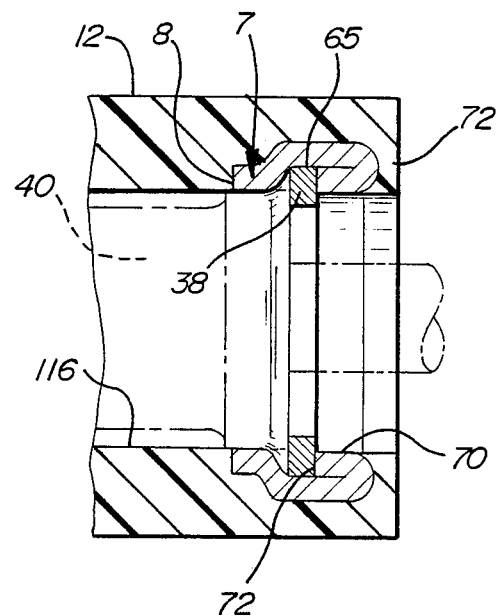

FIG. 4 is a view similar to FIG. 2 showing part of the hydraulic cylinder of FIG. 3 to an enlarged scale, FIG. 5 is an end view of the sleeve of the hydraulic cylinder of FIG. 4 looking in the direction of arrow V in FIG. 4, FIG. 6 is a view similar to FIG. 4 showing part of another form of hydraulic cylinder in accordance with the present invention, FIG. 7 is a cross-section through one form of anchoring element, FIG. 8 is a view similar to FIG. 4 showing the way in which the anchoring element of FIG. 7 can be used to retain the piston in a cylinder defined by a moulded housing, FIG. 9 is a cross-section through another form of anchoring element, and FIG. 10 is a view similar to FIG. 6 showing the way in which the anchoring element of FIG. 9 can be used to retain the piston in a cylinder defined by a moulded housing.

Figure 1:
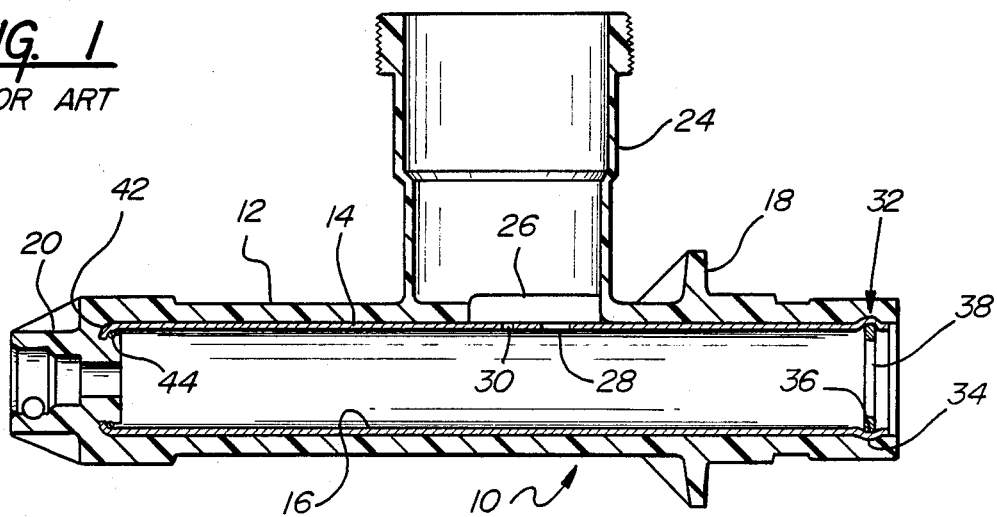
FIGS. 1 and 2 are views of prior art hydraulic cylinders.

In FIGS. 3 to 10 parts corresponding to parts in FIGS. 1 and 2 carry the same reference numerals and will not be described in detail.

Referring to FIGS. 3 to 5, the offset portion 32 of the sleeve or liner 14 is formed with a plurality of projections 60 adjacent its right hand end as viewed in FIGS. 3 and 4. The projections are formed by applying radially inward forces to the offset portion 32 so as to punch sleeve portions 62 inwardly thereby causing the offset portion to shear along edges 63. The projections are equi-spaced circumferentially as seen from FIG. 5 and form radial surfaces 64 which extend inwardly across and engage a peripheral margin of the spring ring 38 inboard of its outer peripheral edge 65. The surfaces 64 provide a series (six in the embodiment shown) of surfaces which positively retain the spring clip 38 against the action of the piston return spring. Unlike the embodiment of FIGS. 1 and 2 where the ring is retained by a wedge effect, the surfaces 64 act as positive stops engaging the ring over the aforesaid margin. The inner surfaces of the projections 60 lie on a circle of diameter no less than the external diameter of the piston 40 to enable the piston to be inserted into the sleeve from the right hand end. The offset portion 32 and edges 63 when molded into the housing 12 prevent relative axial movement taking place between the sleeve and housing.

In FIG. 6 the offset portion 32 of the sleeve 14 is bent inwardly and back on itself to form an inner cylindrical rim 70 which terminates at an annular abutment surface 72. The abutment surface is radial and extends inwardly across the peripheral margin of the spring ring 38 inboard of its outer peripheral edge 65. The internal diameter of the rim 70 is no less than the diameter of the piston 40 to enable the piston to be inserted into the sleeve from the right hand end. During molding of the plastics housing 12, a flange 72 is formed which extends inwardly over the right hand end of sleeve 14 to retain the sleeve in the housing.

With the embodiments shown in FIGS. 3 to 6, the deformation of the sleeve to produce the projection 60 and rim 70 involves the formation of the offset portion 32 to provide secure anchoring of the sleeve 14 in the molded plastics housing 12.

Instead of forming the sleeve or liner 14 with the projections 60, the latter could be formed on a separate ring of material 4 having an annular end surface 5 as in FIG. 7. In such a case, the ring 4 could be used as an anchoring element either to hold the sleeve or liner 14 in position in the housing as well as acting to locate the piston retainer 38 or could be used as shown in FIG. 8. In the former case the sleeve or liner 14 would simply terminate at an annular end surface 6 shown in broken lines in FIG. 4 and the separate ring of material would be molded into the housing 12 adjacent the liner 14 with its end surface 5 in abutment with the end surface 6. In FIG. 8 the ring 4 is molded into the housing 12 to form a stop for the piston retainer 38 where the housing itself defines a bore 116 in which the piston 40 is axially slidable. As in FIG. 6, a flange 72 is formed during molding of the plastics housing and extends inwardly over the right hand end of the ring 7.

I claim:

1. A hydraulic cylinder comprising a housing in which a piston is slidably mounted and retention means molded into the housing to provide a surface engageable with a piston retainer member at a position radially inboard of an outer periphery of the retainer member, said surface being provided by shearing a portion of the retention means to provide at least one radially inward projection engageable with the retainer member, the housing and retention means being formed from dissimilar materials.

2. A hydraulic cylinder according to claim 1 in which a plurality of said projections are formed by shearing.

3. A hydraulic cylinder according to claim 2 in which the projections are circumferentially spaced equally.

4. A hydraulic cylinder according to claim 1 in which the shearing of the retention means forms means for anchoring said retention means to said housing. means for anchoring said retention means to said housing.

5. A composite structure according to claim 1 in which the surface engageable with the retainer member is a radial surface.

6. A hydraulic cylinder according to claim 1 in which the retention means retains a tubular sleeve in the housing, the tubular sleeve defining a cylinder in which the piston is slidable.

7. A hydraulic cylinder according to claim 6 in which the retention means forms part of the tubular sleeve.

8. A hydraulic cylinder according to claim 7 in which the retention means is formed on one end of the sleeve.

9. A hydraulic cylinder according to claim 6 in which the shearing of the retention means forms means for anchoring the tubular sleeve to the housing to prevent longitudinal displacement of one relative to the other.

10. A hydraulic cylinder according to claim 6 in which the retention means and tubular sleeve are separate elements.

11. A hydraulic cylinder comprising a housing in which a piston is slidably mounted and retention means molded into the housing to provide a surface engageable with a piston retainer member at a position radially inboard of an outer periphery of the retainer member, the surface being provided by bending inwardly back upon itself a portion of the retention means to that an edge of the retention means forms said surface engageable with the retainer member, the housing and retention means being formed from dissimilar materials.

12. A hydraulic cylinder according to claim 11 in which the retention means is tubular and an end portion thereof is bent inwardly back upon itself.

13. A hydraulic cylinder according to claim 12 in which the bent end portion of the retention means forms an annular abutment surface for the retainer member.

14. A method of making a hydraulic cylinder comprising molding from one material a housing for a piston around a retention means of a different material and shearing a portion of the retention means to provide at least one radially inward projection engageable with a piston retainer member at a position radially inboard of an outer periphery of the retainer member.

15. The method of claim 14 including using the shearing of the retention means to provide means projecting into the material for anchoring the retention means within the housing.

16. The method of claim 14 including forming a plurality of said projections by shearing.

17. The method of claim 16 including spacing said projections equally in a circumferential direction.

18. The method according to claim 14 including using the retention means to retain a tubular sleeve in the housing, the tubular sleeve defining a cylinder in which the piston is slidable.

19. The method of claim 18 including forming the retention means as part of the tubular sleeve.

20. The method of claim 19 including forming the retention means on one end of the tubular sleeve.

21. The method of claim 18 including using the inward projection on the retention means as means for anchoring the tubular sleeve to the housing to prevent longitudinal displacement of one relative to the other.

22. A method for making a hydraulic cylinder comprising molding from one material a housing for a piston around retention means of a different material, and bending inwardly back upon itself a portion of the retention means so that an edge of the retention means forms said surface engageable with the retainer member at a position radially inboard of an outer periphery of the retainer member.

23. The method of claim 22 including providing a tubular retention means and bending an entire end portion of the retention means back upon itself.

24. The method of claim 23 including forming the bent end portion of the retention means as an annular abutment surface for the retainer member.

25. A method for making a hydraulic cylinder comprising molding from one material a housing for a piston around retention means of a different material, the retention means having been deformed to provide a surface engageable with a piston retainer member at a position radially inboard of an outer periphery of the retainer member, using the retention means to retain a tubular sleeve in the housing, the tubular sleeve defining a cylinder in which the piston is slidable, and forming the tubular sleeve and retention means as separate elements.

* * * * *

UNITED STATES PATENT AND TRADEMARK OFFICE
CERTIFICATE OF CORRECTION

PATENT NO. : 4,872,396

DATED : October 10, 1989

INVENTOR(S) : Maurice J. Wimbush

It is certified that error appears in the above-identified patent and that said Letters Patent is hereby corrected as shown below:

Column 5, line 64, after "housing." delete "means for anchoring said retention means to said housing."

Signed and Sealed this

Thirtieth Day of October, 1990

Attest:

HARRY F. MANBECK, JR.

Attesting Officer

Commissioner of Patents and Trademarks